May 4, 1965  E. F. KOHL  3,181,659

PANELS

Filed Jan. 24, 1961  6 Sheets-Sheet 1

INVENTOR
Everard F. Kohl
BY John Mahoney
ATTORNEY

May 4, 1965  E. F. KOHL  3,181,659
PANELS
Filed Jan. 24, 1961  6 Sheets-Sheet 3

INVENTOR
Everard F. Kohl
BY John Mahoney
ATTORNEY

May 4, 1965   E. F. KOHL   3,181,659
PANELS
Filed Jan. 24, 1961   6 Sheets-Sheet 4

INVENTOR
Everard F. Kohl
BY John Mahoney
ATTORNEY

INVENTOR
Everard F. Kohl

May 4, 1965 E. F. KOHL 3,181,659
PANELS
Filed Jan. 24, 1961 6 Sheets-Sheet 6

INVENTOR
*Everard F. Kohl*
BY *John Mahoney*
ATTORNEY

United States Patent Office 3,181,659
Patented May 4, 1965

---

3,181,659
PANELS
Everard F. Kohl, 16920 Edgewater Drive,
Lakewood 7, Ohio
Filed Jan. 24, 1961, Ser. No. 84,628
7 Claims. (Cl. 189—34)

The present invention relates to panels of the sandwich type for use in building constructions, accessories, and appliances, and is a continuation in part of my copending application Ser. No. 822,007, filed on June 22, 1959, which has matured into Patent No. 2,970,373, granted on February 7, 1961. It also relates to means and to a process for locking two or more of such panels together to provide a composite panel and to an improved process of preparing core strips for use in preparing such panels.

In application Ser. No. 822,007, a method of preparing panels of the sandwich type is disclosed in which core strips are mechanically connected to outer sheets or skins by a rolling or pressing operation in the presence of removable supports for each of the core strips to provide a fire resistant structure having smooth outer surfaces to which a finishing material may be applied to one or both of the outer faces of the sheets prior to assembly. The panel of the present application consists of outer sheets or skins spaced from each other by core strips, each having tapered projections in its upper and lower margins which are angularly embedded in the metal of the respective sheets and which may be and preferably is prepared in the manner disclosed in application Ser. No. 822,007. To provide a strong structure, the core strips are substantially sinuous or zigzag in shape to provide a comparatively strong bracing for the outer sheets and each core strip includes a series of aligned focal portions or apices on each side of the core strip and side wall portions diverging from each other at an angle from each focal portion or apex, each of which terminates in a focal portion or apex at the opposite side of the core strip. To enable the core strips to be arranged in close proximity to each other to provide a comparatively strong structure, the focal portions or apices on each side of each core strip are arranged in alignment with the corresponding focal portions or apices on each of the other core strips.

To minimize thermal conduction between the outer sheets or skins, the core strips are preferably so thin in cross section that they would collapse under the pressure required to force the projections in their margins into the outer sheets in the absence of supporting means therefor. In such case, the core strips are spaced from each other at a sufficient distance to permit the removal of supporting means arranged on opposite sides of each core strip during the pressing or rolling operation and the angle between the diverging side wall portions of each core strip and the distance the core strips are spaced from each other is preferably such that the perpendicular distance between parallel lines drawn through aligned focal portions or apices on the opposite sides of each core strip is greater than the perpendicular distance between lines drawn through the focal points or apices of adjacent core strips.

To further reduce the thermal conductivity of the panel, each of the tapered projections on each side margin of each core strip is preferably of such length that only a portion of each tapered projection of each core strip is angularly embedded in the outer sheets or skins and if desired, openings may be provided in the faces of each side wall of each angularly-shaped portion of each core strip.

It is therefore an object of the present invention to provide an improved panel in which metal core strips are mechanically connected to outer sheets to provide a sandwich construction which is fire resistant and which has high strength and a smooth outer surface.

Another object of the invention is to provide an improved panel in which thin metal core strips, each having a plurality of angularly-shaped portions, are mechanically connected to the outer sheets or skins in a manner to provide a sandwich construction that is light in weight and which has high strength and low thermal conductivity.

A further object of the invention is to provide an improved panel in which tapered projections in the marginal edge portions of the core strips extend into and are angularly embedded in outer metal sheets and in which the core strips are so thin in cross section that they would collapse under the pressure required to force the projections in their margins into the outer sheets in the absence of supporting means therefor during the pressing or rolling operation.

Another object of the invention is to provide a composite panel of the sandwich type including means and an improved process of looking two or more panels together.

A still further object of the invention is to provide an improved process of preparing core strips for use in panels of the sandwich type.

My invention will be better understood by reference to the accompanying drawings in which.

As shown in the drawings, my improved panel consists of outer skins or sheets 1 and 2 which may be formed of any suitable metal stock, such as rolled aluminum or steel, and between which are interposed core strips 3 that are mechanically connected to the outer sheets or skins in a manner to minimize thermal conductivity between the sheets or skins. To provide a strong support for the outer sheets or skins, each of the core strips 3 is substantially sinuous or zigzag in shape and consists of a comparatively large number of angularly-shaped portions and while the angles between adjacent portions may vary in size and may be obtuse or acute, they are preferably arranged at an angle of approximately 90° relative to each other. In general, it may be stated that the angle between the diverging side wall portions of each core strip should be such that each core strip provides a comparatively large number of braces for the outer sheets. When the core strips are comparatively thin, however, the angles between the diverging side wall portions of the core strip should be large enough to enable supporting means for the core strips to be arranged adjacent the diverging side walls of the core strips during the pressing or rolling operation.

Figures 5, 6:
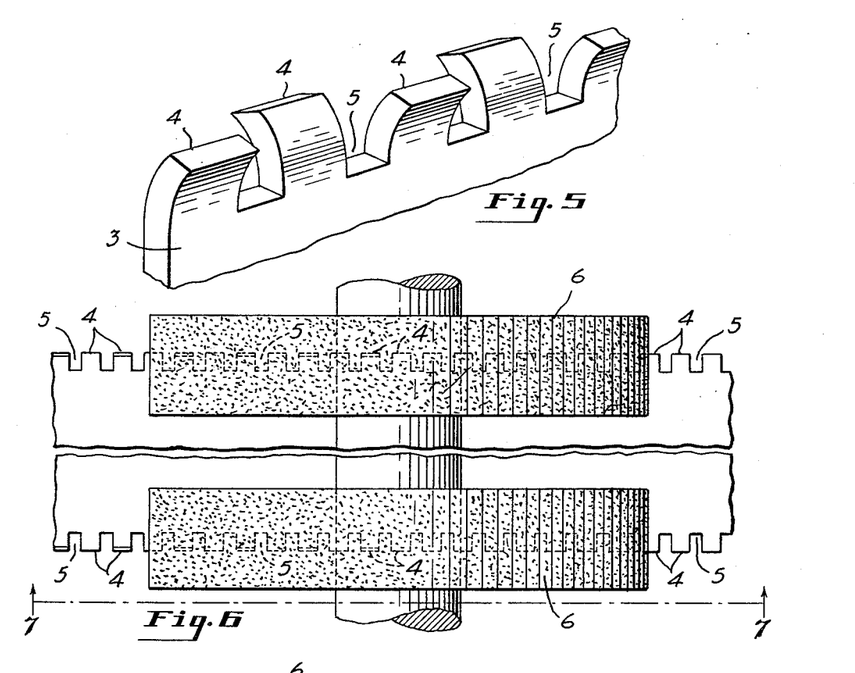
FIG. 5 is an enlarged fragmentary perspective view of the upper margin of a core strip after a cutting and stamping operation but prior to a grinding operation.
FIG. 6 is a plan view of a core strip showing a pair of grinding rollers, one of which is shown engaging one of the side margins and the other the other side margin on the same side of the same core strip.

To enable the panel to be prepared in an economical manner, I provide an improved process of preparing the core strips. In accordance with my invention, a sheet of rolled metal, such as aluminum or steel, is stamped between dies to provide a series of projections 4 separated by slots 5 which are preferably of less width than the projections as shown in FIG. 5 and to taper the projections in an alternate symmetrical relation to provide a structure in which approximately half of the projections are tapered in one direction and the remainder in the opposite direction. For instance, two or more consecutive projections may be tapered in one direction and a series of two or more consecutive projections may be tapered in the opposite direction. For purposes of illustration, each of the alternate projections are shown as being tapered in one direction and each of the other alternate projections in the opposite direction. When the term alternate symmetrical relation is applied to the manner in which the projections are tapered, it is therefore intended to cover not only structure in which the alternate projections are tapered in opposite directions but also structure in which a series of two or more consecutive projections are tapered in one direction and a series of two or more consecutive projections are tapered in the opposite direction. For instance, it is intended to cover a structure in which the projections in one side wall portion of each V-shaped portion of a substantially sinuous or zigzag strip is tapered in one direction and the projections in the other side wall portion of the same V-shaped portion are tapered in the opposite direction.

Figure 7:
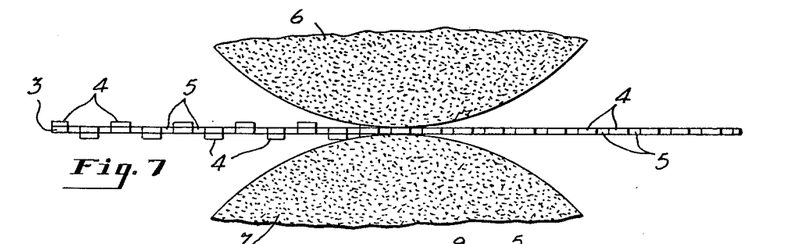
FIG. 7 is a side elevational view taken on a plane passing through the line 7—7 of FIG. 6, looking in the direction of the arrows and showing one of the margins of a core strip being passed between a pair of grinding rollers.
Figure 8:
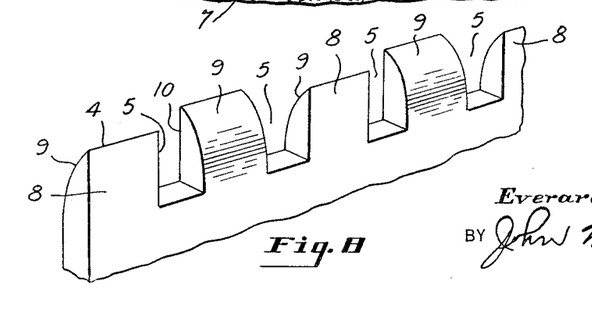
FIG. 8 is an enlarged fragmentary perspective view of a core strip after the grinding operation.

After the rolled sheets have been subjected to the cutting and stamping operation, the margins of the sheets are substantially of the shape shown in FIG. 5 in which alternate projections protrude from one face of the sheet and the other alternate projections protrude in the opposite direction from the other face of the sheet. To provide a structure in which one face of each projection is coplanar with a face of the core strip and the other is tapered toward its coplanar face, the side margins of the sheet are each passed between a pair of grinding rollers 6 and 7 as shown in FIGS. 6 and 7 which grind away that portion of each projection which extends outwardly beyond a face of the sheet to form a structure as shown in FIG. 8 in which one face 8 of each alternate projection is coplanar with one face of the core strip and its other face 9 is tapered toward its coplanar face and in which one face 10 of each of the other alternate projections are coplanar with the other face of the core strip and each has a face 9 which is tapered toward its coplanar face and in which the outer penetrating edge portion of each projection is of the same width as its base portion.

To provide a strong support for the outer sheets or skins, each core strip is then bent into a substantially sinuous or zigzag shape to provide a comparatively large number of angularly-shaped portions of the same shape as each of the other core strips and to enable a comparatively large number of core strips to be disposed in close relation to each other, the focal portions or apices of the angularly-shaped portions of each core strip are arranged in alignment with the corresponding focal portions or apices of the angularly-shaped portions of each of the other core strips.

Figure 10:
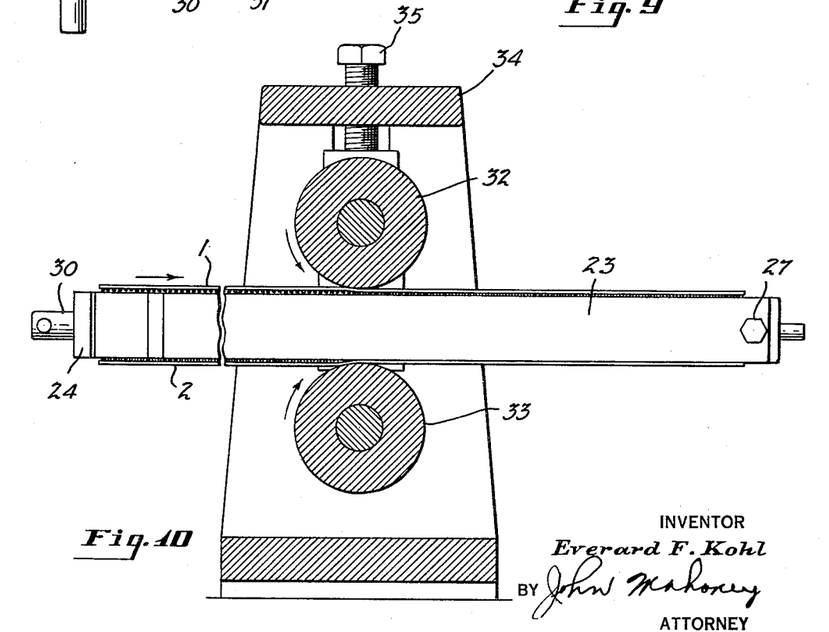
FIG. 10 is a cross sectional view of a pair of rollers with parts in section and showing a panel and the supporting frame member being passed between the rollers.

In accordance with the present invention, the panel may be formed by disposing the core strips between the outer sheets 1 and 2 and subjecting the assembled structure to a pressing or rolling operation as shown in FIG. 10. When the core strips are assembled in place, the face 8 and the face 10 of each of the alternate projections in the upper margin extends normal to the upper sheet and in a like manner the face 10 of each alternate projection in the lower margin of each core strip extends normal to the lower sheet and the other face 9 of each projection in both the upper and lower margins is tapered toward its normally extending face to provide an outer penetrating edge portion on each projection which is of the same width as the remainder of the projection and to minimize the thermal conduction between the sheets or skins and the core strips, the core strips are preferably formed of a metal that is thinner than the outer sheets and the tapered projections in each side margin are preferably of such height, such as approximately 1/16 of an inch, that only part of the tapered portion of each projection in the upper margin of each core strip is forced into and angularly embedded in the upper sheet or skin and only a portion of each projection in the lower margin of each core strip is forced into and angularly embedded within the lower sheet or skin during the pressing or rolling operation. When the projections are forced into and are angularly embedded therein, each projection displaces part of the metal of the sheet to form small outwardly extending bosses or pebbles as indicated by the numeral 11 in FIGS. 4 and 13.

Figure 1:
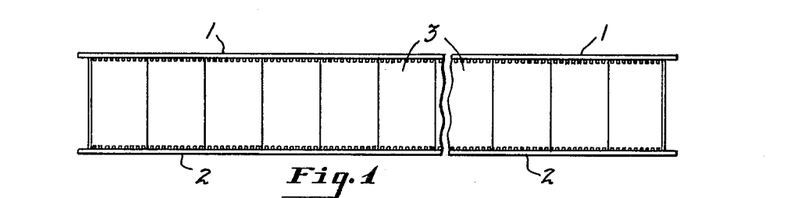
FIG. 1 is a side elevational view of my improved panel prior to the pressing or rolling operation.
Figure 2:
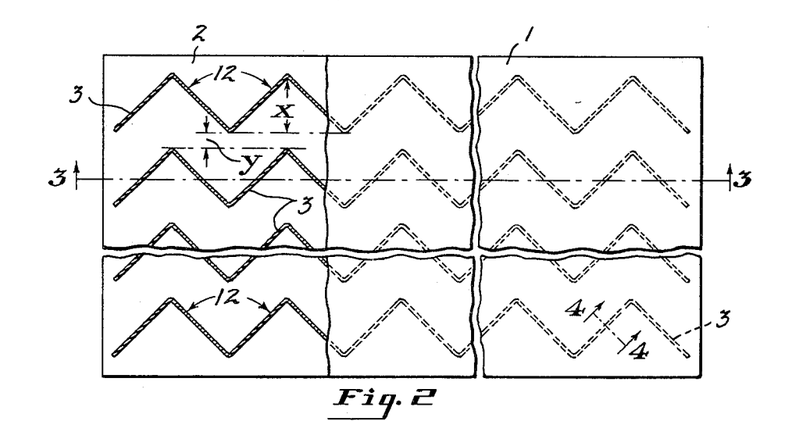
FIG. 2 is a plan view with parts of the upper sheet broken away to show the upper edge portion of the metal core strips prior to the pressing or rolling operation.
Figure 3:
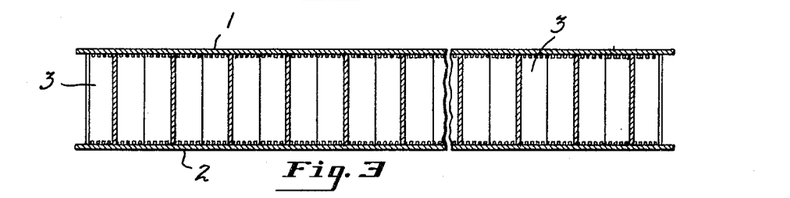
FIG. 3 is a cross sectional view taken on a plane passing through the line 3—3 of FIG. 2, looking in the direction of the arrows.

To provide a panel having low thermal conductivity, however, it is desirable to provide core strips which are so thin in cross section that it is necessary to support them to prevent their collapse during the pressing or rolling operation. In such case, it is essential that the angle 12 between the diverging side wall portions of each core strip as shown in FIG. 2 shall be large enough to enable supports to be applied on the opposite sides of each core strip and the distance between proximate core strips should be sufficient to permit the withdrawal of the supporting means from between the core strips after the pressing or rolling operation. In general, it may be stated that the diverging side wall portions of each core strip shall be at such an angle to each other that the perpendicular distance as indicated by the letter X in FIG. 2 between parallel lines drawn through the aligned focal portions or apices on each side of a core strip is greater than the perpendicular distance as indicated by the letter Y between lines drawn parallel to focal portions or apices of proximate core strips. As shown, the angle between the diverging side wall portions extending from each focal portion or apex of each core strip is approximately 90°.

The projections on the core strips are harder than the metal of which the sheets are composed so that they may be forced into and angularly embedded in the sheets. For instance, when a panel is desired which is light in weight, the outer sheets or skins are preferably formed of aluminum. Aluminum, however, has high thermal conductivity and consequently when the outer sheets or skins are formed of aluminum, the core strips are preferably formed of a metal that is harder than and has a lower thermal conductivity than aluminum, such as iron or steel.

In building constructions, the panel will not usually be subjected to as high a pressure in service as that required to force the projections of the core metal into the respective sheets and consequently even when the core strips are comparatively thin in cross section, panels of sufficient strength will be provided for use in service when the core strips are arranged in comparatively close relation to each other and each is provided with a comparatively large number of angularly-shaped portions which brace the outer sheets.

The thickness of the core strips depend upon their height which in turn depends upon the thickness of the panel desired. It also depends upon the metal of which the core strips is composed. To further reduce the thermal conductivity of the panel in accordance with the present invention, each of the core strips is therefore preferably formed of a metal that is so thin in cross section that the core strips would collapse when pressure is applied to the outer sheets to force the projections in the upper and lower margins of the core strips into the respective sheets and to angularly embed them therein unless means is provided to support the core strips during assembly. For instance, as a specific example, which is in no manner to be considered a limitation on the present invention, when the outer sheets are formed of aluminum having a thickness of approximately $\frac{1}{16}$ of an inch and each of the core strips is formed of steel having a height of approximately two inches and a thickness of approximately $\frac{1}{64}$ of an inch and has projections on each of its side margins which are alternately tapered in opposite directions, a pressure of approximately 5000 pounds per linear inch of each core strip applied to the outer faces of the sheets is required to force portions of the tapered projections in the upper and lower side margins of each of the core strips into the metal of the sheets and to move the sheets toward each other a sufficient distance to cause the sheets to angularly embed the projections within the respective sheets. Under such conditions, it is necessary to support the core strips during the pressing or rolling operation to prevent them from collapsing under the pressure applied to the outer faces of the sheets.

While the core strips may be supported in any desired manner during the pressing or rolling operation, to enable a comparatively light panel to be prepared and to recover the supports for use in preparing other panels, the supports for the core strips are preferably removable after the pressing or rolling operation. To provide a strong bracing structure even when the core strips are comparatively thin, the core strips are arranged in such close proximity to each other that only a small space exists between proximate core strips and to enable the core supports to be removed through this space, the supports consist of a series of strips or pairs of strips pivotally secured together and while each of the supports may consist of a series of pairs of strips pivotally mounted on the same pivot between resilient means and which are forced outwardly into engagement with the sheets by the resilient means, as shown, supporting means is provided which is of less height than the core strips and consists of two supports A and B arranged on the opposite sides of each core strip. Each of the supports is formed of a strong metal, such as steel, and consists of vertically extending metal strips, the sides of which are pivotally connected together in such a manner that the supports may be easily removed from the panel through a comparatively narrow space after the pressing or rolling operation. As shown, the opposite sides of each strip of each support is provided with spaced knuckles which interfit with knuckles on the adjacent strip and is pivotally connected thereto by a vertically extending pivot pin and while the core strips may all be of the same length, to enable the core strips to be arranged in close proximity to each other, each of the strips of each support preferably consists of short horizontally extending strips, each of which engages the focal portion or the apex of an angularly-shaped portion of a core strip and the opposite sides of which are pivotally connected to one or to a pair of pivotally connected strips.

As shown in FIGS. 9 and 11 to 14, each of the supports A consists of a plurality of short vertically extending strips 13, each of which extends horizontally and engages the focal portion or apex of an angularly-shaped portion of the core strip and one of the short horizontally extending strips 13 in proximity to one end of the core strip is pivotally connected to one side of a vertically extending strip 14 which extends from one of its ends and the short horizontally extending strip 13 which is in proximity to the other end of the core strip is pivotally connected to the side of a vertically extending strip 15 which engages one side of the angularly-shaped portion which extends to the other end of the core strip and intermediate the ends of the core strip, one side of each horizontally extending strip 13 of the support A is pivotally connected to a strip 15 of a pair of strips 15 and 14 which extend along the sides of an angularly-shaped portion of the core strip and are pivotally connected together by a pivot pin 16 at approximately the crotch of the angularly-shaped portion. Strip 14 of each pair of strips 15 and 14 in turn is pivotally connected to one side of a second short longitudinally extending strip 13 and the opposite side of the second strip 13 is pivotally connected to one side of a strip 15 of a pair of strips 15 and 14 which extend along the sides of a second angularly-shaped portion of the core strip and are pivotally connected together by a pivot pin 16 at approximately the crotch of the second angularly-shaped portion, and in the event that the core strips are longer than those shown in the drawings, this arrangement is continued throughout the length of the core strip.

Figure 9:
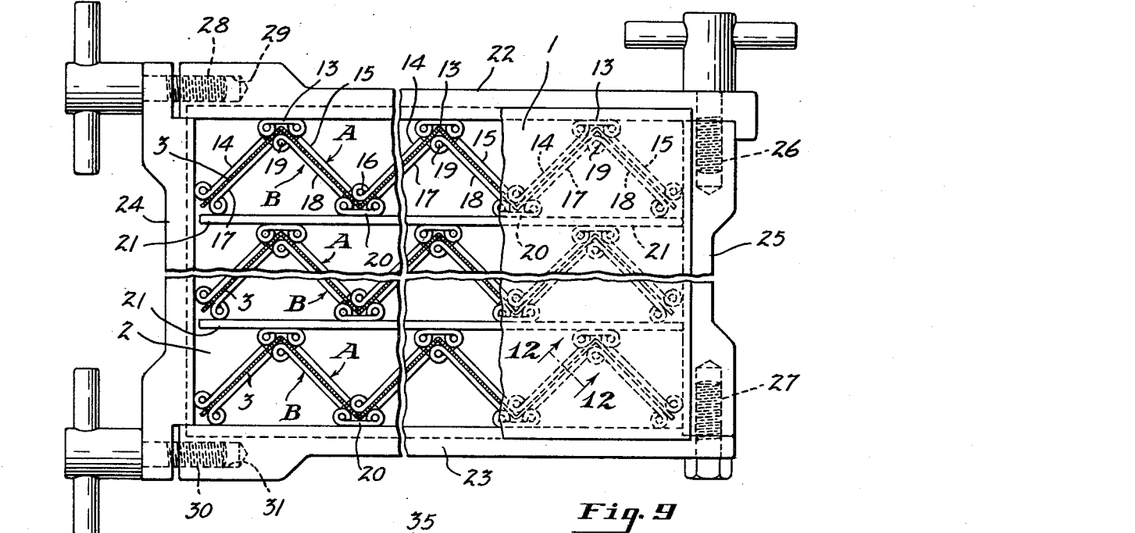
FIG. 9 is a plan view of an assembly including metal core strips interposed between upper and lower sheets with only a fragmentary portion of the upper sheet being shown and a frame for supporting the core strips between upper and lower sheets during the pressing or rolling operation.

The support B for the opposite side of each core strip is arranged in substantially the same manner. As shown, the sides of one pair of strips 17 and 18 engage the inner face of a V-shaped portion of a core strip and are pivotally connected together by a pivot pin 19 which is arranged in close proximity to the crotch of a V-shaped portion and one end of strip 18 is pivotally connected to one side of a horizontally extending short strip 20 and the opposite side of the short strip 20 is pivotally connected to one side of a strip 17 of another pair of strips 17 and 18, the sides of which engage the side walls of the next angular-shaped portion and are pivotally connected together by a pin 19 arranged in proximity to the walls of the V-shaped portion, and this arrangement of the vertically extending strips of the supports is continued throughout the length of each core strip.

To provide a further support for the core strips and to enable the pivotally connected supports A and B to be easily removed after the core strips have been mechanically connected to the outer sheets, a strip 21 which may be formed of a metal, such as steel, and which if desired may be slightly flexible, is disposed in each of the spaces between the longitudinally extending short portions of each pair of supports B and A and to hold the supports in place during the pressing or rolling operation, a frame is provided consisting of side walls 22 and 23 and end walls 24 and 25. The inner margin of side wall 22 extends between sheets 1 and 2 and engages the longitudinally extending strips 13 and the inner margin of side wall 23 extends between sheets 1 and 2 and engages the longitudinally extending strips 20 and knuckles of the outermost support B.

The side and end walls of the frame may be connected together in any desired manner, such as by screws 26 and 27, which extend through the respective side walls and are threaded into the enlarged portion of the end wall 25. The end wall 24 may be connected to the side walls in a somewhat similar manner. As shown, a screw 28 extends through the end wall 24 and is threaded into an internally threaded opening 29 in an enlarged portion of the side wall 22 and a screw 30 is threaded into an internally threaded portion 31 in an enlarged portion of the side wall 24.

Figure 4:
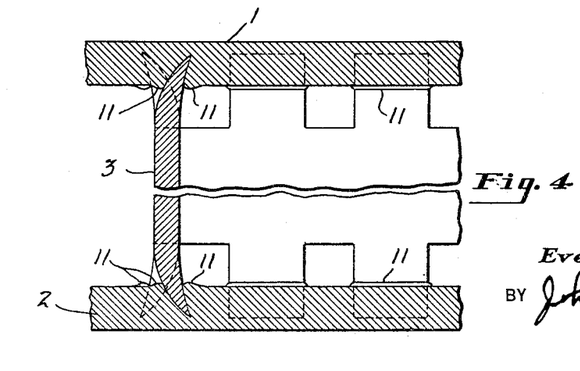
FIG. 4 is an enlarged sectional view taken on a plane passing through the line 4—4 of FIG. 2, looking in the direction of the arrows, showing the parts in position after the pressing operation.
Figures 11, 12:
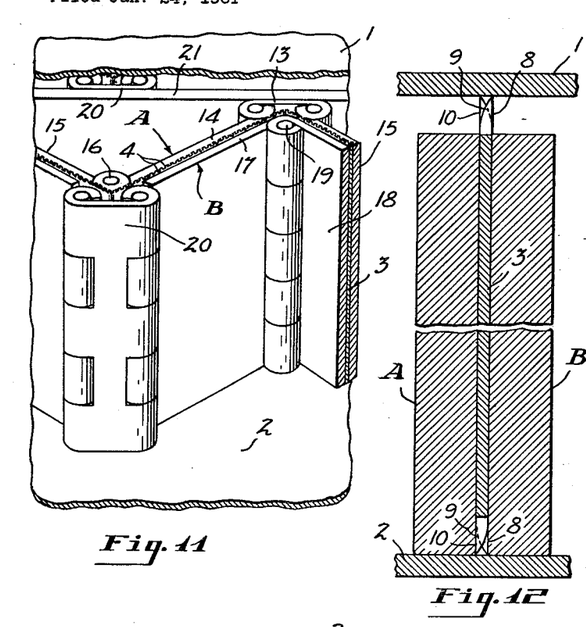
FIG. 11 is an enlarged perspective view of a portion of a panel prior to the pressing operation with the upper and lower sheets being shown broken away.
FIG. 12 is an enlarged sectional view of a fragmentary portion of a panel showing a core strip and supporting means therefor prior to the pressing operation as seen from a plane passing through the line 12—12 of FIG. 9.
Figure 13:
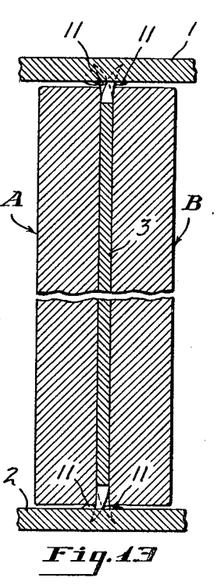
FIG. 13 is a view similar to FIG. 12 after the pressing operation.
Figure 14:
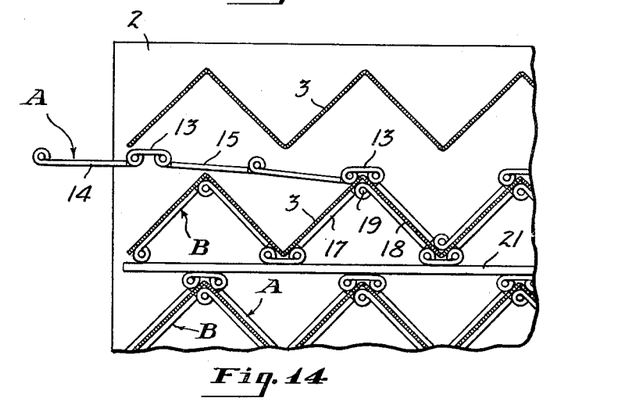
FIG. 14 is a plan view with the upper sheet removed and parts broken away, showing one of the supporting strips being removed after the rolling operation.

As shown when the sheets, core strips, supports, and frame are assembled in place in the manner described, the lower edges of the supports and the core strips rest upon the bottom sheet as shown in FIG. 12 and are moved upwardly when pressure is applied to the opposite faces of the sheet to force portions of the upper and lower projections in the margins of each core strip into the outer sheets and to move the sheets toward each other to angularly embed the tapered projections within the sheets in an alternate symmetrical relation as shown in FIGS. 4 and 13 at which time the numerous angularly-shaped portions of the core strips provide strong braces for the outer sheets or skins and this is true even though the core strips are comparatively thin in cross section.

Pressure may be applied to the outer faces of the sheets by any suitable means, such as a press, or as shown in FIG. 10, the assembly including the outer sheets, the core strips, and the supports for the core strips which are held in place by the frame may be passed between rollers 32 and 33 of press 34. As shown rollers 32 of press 34 may be adjusted by means of a screw 35 to enable panels of various thickness to be passed between the rollers.

After the core strips have been mechanically connected to the outer sheets, screws 26, 27 and 28 may be released and the frame and the outermost supports A and B may be removed. The straight supports 21 may then be withdrawn and because the remaining supports A and B each consists of vertically extending strips, pivotally connected together, they may be easily withdrawn through the spaces between the adjacent core strips in the manner shown in FIG. 14. It will be noted that because the apices of the angularly-shaped portions of each core strips are arranged in alignment with the corresponding apices of each of the other core strips, the pivotally connected supports may be withdrawn from between the core strips even when the core strips are arranged in close proximity to each other.

While the core strips may all extend in the same direction, it will be understood that some of the core strips may extend in one direction and the other core strips may extend in a direction perpendicular to the first core strips. For instance, in FIG. 15, the core strips 3 in the central portion of the panel extend one direction while the core strips 3a in the opposite side portions extend in a direction perpendicular to those in the central portion of the panel. In such case, if the core strips are so thin in cross section that it is necessary to support them during the pressing or rolling operation, the supporting means for the central core strips can be removed through one of the ends of the panel and the supporting means for the core strips that extend in a direction perpendicular to the central strip toward one side of the panel may be withdrawn outwardly through one side and the supports for the core strips that extend in the other direction perpendicular to the central core strips may be withdrawn through the opposite side of the panel after the core strips have been mechanically connected to the outer sheets or skins. Panels formed in the manner shown in FIG. 15 are particularly advantageous when it is desired to lock at least three panels together to form a composite structure.

Figure 15:
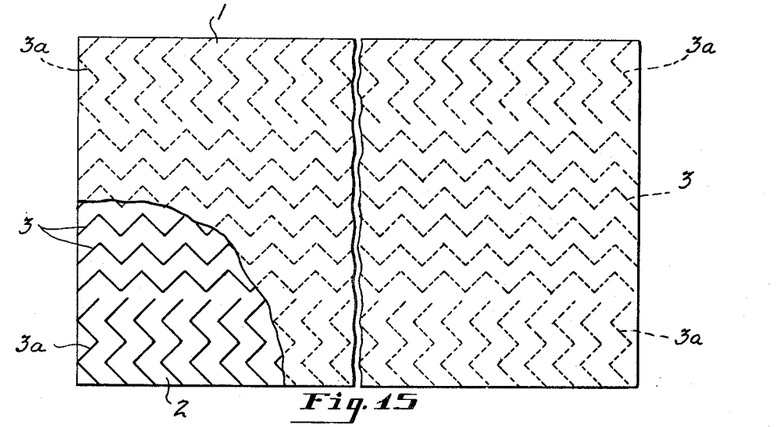
FIG. 15 is a plan view of a panel showing the core strips at the central portion of the panel extending in one direction and the core strips in the side portions of the panel extending in a direction which is substantially perpendicular to the centrally-arranged core strips.
Figure 16:
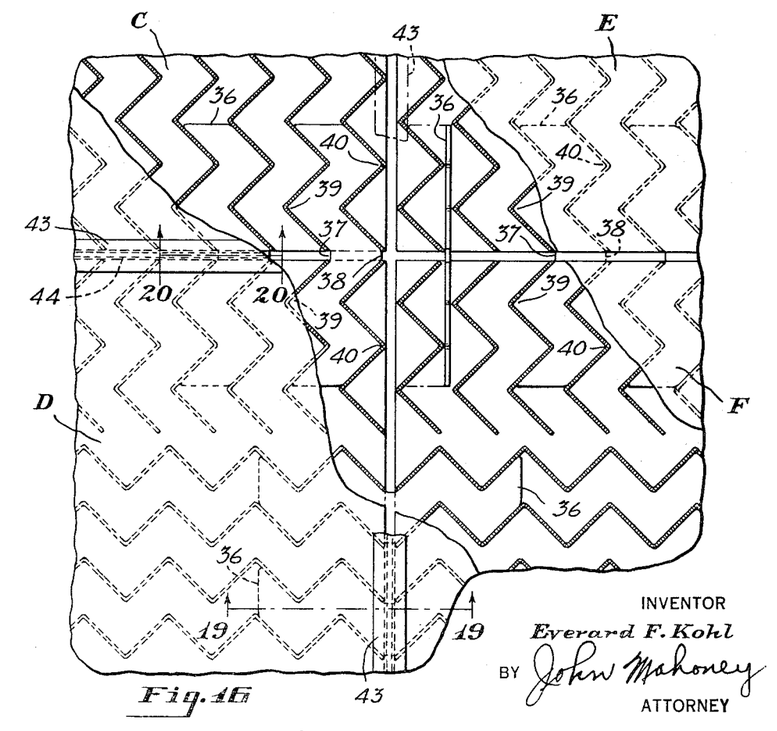
FIG. 16 is a plan view of a composite assembly including a plurality of panels with the upper sheet of each panel broken away to show underlying parts and showing means for locking the panels together and sealing strips arranged between the adjacent panels which is also shown broken away to show underlying structure.
Figures 17, 18, 19:
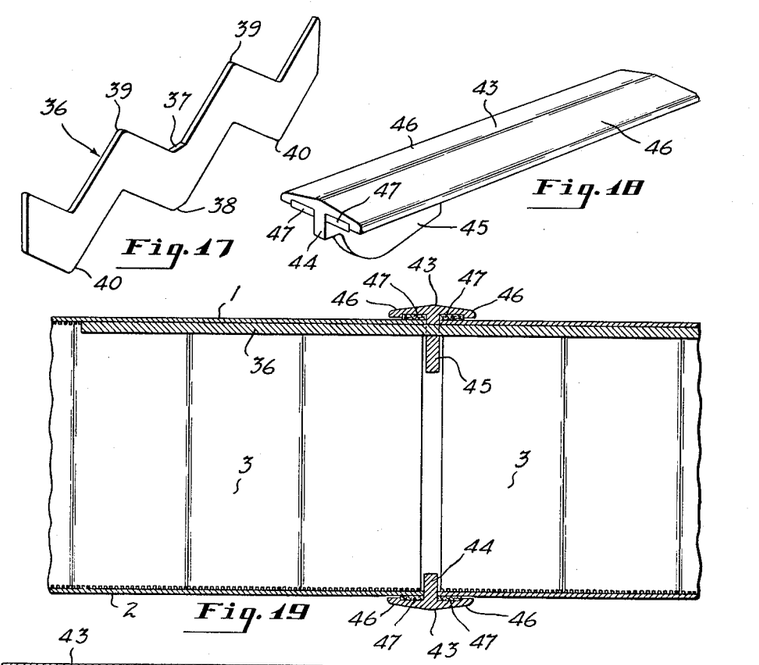
FIG. 17 is a perspective view of a locking strip.
FIG. 18 is a perspective view of a sealing strip with parts broken away.
FIG. 19 is a cross sectional view of a composite panel taken on a plane passing through the line 19—19 of FIG. 16, showing two panels locked together and sealing strips arranged to close the upper and lower openings between the panels.

In view of the zigzag shape of the core strips shown in FIGS. 15 and 16, a pair of panels C and D, E and F, or D and F, having core strips extending in the same direction may be locked together or all of the panels may be locked together to form a composite structure. To lock panels E and F together as shown in FIG. 16, locking strips of the type shown in FIG. 17 may be provided. As shown in FIG. 17, each locking strip has a central portion having straight horizontally extending short sides and end portions extend from the central portion which have aligned apices 39 on one side and aligned apices 40 on the opposite side. The number of locking strips provided will of course depend upon the length of the panel desired. In the fragmentary portion of panel E in FIG. 16, three locking strips are shown which are spaced from each other.

In locking panels E and F together as shown in FIG. 16, one end portion of one locking strip 36 is inserted vertically in a slot between a pair of core strips 3 and one end portion of a second locking strip is inserted vertically in a slot between a second pair of core strips 3 in panel E which are spaced from the first pair and the central portion and the other end portion of each of the locking strips extend outwardly from the panel E. Panel F is then arranged in such relation to panel E that it receives the outwardly extending end portion of one of the locking strips in a slot between a pair of core strips 3 corresponding to the first pair of core strips 3 in panel E in which the first locking strip is inserted and the outwardly extending end portion of the second locking strip is inserted in a slot between a second pair of core strips 3 in panel F which corresponds to the second pair of core strips 3 in panel E in which the first end portion of the second locking strip is inserted, and the central portion of each locking strip is arranged between the two panels. Each of the core strips is then turned to a horizontal position in which one of the apices 39 extends into the crotch of one core strip in panel E and a second apex 39 upon the same side of the locking strip extends into the crotch of the corresponding core strip in panel F and one of the apices 40 on the opposite side of the locking strip extends into the crotch of the angularly-shaped portion of the next adjacent core strip in panel E and the other apex 40 extends into the crotch of the next adjacent core strip in panel F.

Figure 21:
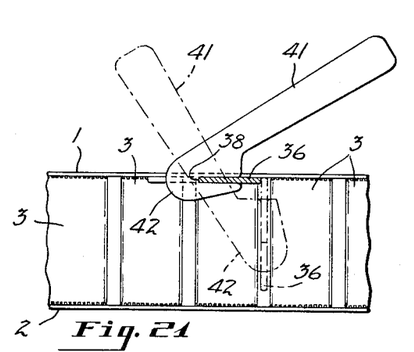
FIG. 21 is a side elevational view of a panel showing a locking strip in dotted lines in its assembled position and in full lines in its locked position and an elevational view of a tool for moving the locking strip from its assembled position to its locked position.

For turning the locking strip to its horizontal position, a tool 41 may be provided as shown in FIG. 21 which is thin enough to be inserted in the slot between panels E and F and which has a hooked portion 42 for engaging the short horizontally extending straight portion 38 of the locking strip as shown in FIG. 21. Instead of turning the locking strips upwardly, some of the locking strips may be arranged between corresponding pairs of core strips of adjacent panels so that the upper straight horizontally extending sides 37 are exposed in which case, the tool 41 may be moved upwardly between the two panels to move its hooked portion into engagement with the straight portion 37 of each core strip in which case the locking strips, or at least part of them, may be turned downwardly into engagement with the adjacent lower sheets of the two proximately arranged panels. Panel C may be locked to panel D and panel D may be locked to panel F to form a composite structure in the same manner.

Figure 20:
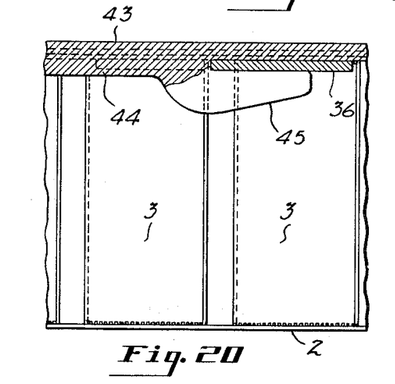
FIG. 20 is a fragmentary cross sectional view taken on a plane passing through the line 20—20 of FIG. 16, showing a sealing strip with its hooked portion engaging a locking means to hold it in place.

After two or more proximately arranged panels have been locked together, means are provided to seal the upper and lower slots between each pair of panels and while any suitable means may be provided for this purpose, as shown in FIGS. 18 and 19, upper and lower sealing strips 43 are provided, at least one of which has means for retaining the locking means in place and the panels in alignment with each other. Sealing strips 43 are preferably formed of a fire resistant material, such as metal, although they may be formed of a plastic material because even if the sealing strips are destroyed in the event of fire, the panel will still remain intact. As shown, each of the sealing strips has a central portion 44 which is arranged to extend inwardly and for retaining the locking means in place and proximate panels in alignment, each of the upper sealing means is provided with spaced hooks 45 and when the sealing means is inserted in place with its central portion extending between proximate panels and is moved toward the right, the respective hooks are moved beneath the locking strips as shown in FIG. 20. The sealing strip is also provided with inwardly extending flanges which are arranged in proximity to the outer faces of the margin of proximately arranged panels to provide narrow slots in which sealing means 47, such as asbestos fibres, or a plastic material having a high melting point, such as Teflon, is inserted.

This sealing means for the lower slot between two proximate panels is the same as that shown for the slot between the upper faces of the panels with the exception that the hooked portions 45 of the sealing strips are omitted when the locking strips are all turned upwardly. If the locking strips, or some of them, are turned downwardly, however, the lower sealing strip is provided with hooked portions 45 for engaging portions 37 on those locking strips that are turned downwardly.

Although the core strips of my improved panel are in close relation to each other, it is apparent that conductors or conduit means for utilities, such as conduit means for water, gas or electrical conductors, may be arranged in the slots between the core strips in the same panel and also in aligned slots in two or more proximate panels, or if desired, insulation may be blown into the slots between proximate core strips of a single panel or aligned slots in two or more proximate panels.

What I claim is:

1. A panel including upper and lower thin metal sheets arranged in opposed relation to each other, a plurality of thin metal core strips interposed between said sheets which are spaced from each other throughout their length, each of which core strips is zig zag in shape and consists of a plurality of focal portions and side walls diverging from each focal portion which focal portions and diverging side walls are parallel to the focal portions and the diverging side walls of other core strips to provide a free space between proximate core strips and each of said core strips having spaced tapered projections in its upper margin which are arranged in close proximity to each other and which are harder than the metal of which the sheets is composed, some of which are tapered in one direction from the first side wall of each core strip to a plane extending beyond the second side wall of the same core strip and others of which are tapered in the opposite direction from the second side wall of the same core strip to a plane extending beyond the first side wall of the same core strip to provide angularly-shaped projections, each of which has an outer penetrating edge and in which each of the angularly-shaped projections is embedded in the metal of the upper sheet to provide a mechanical connection between the core strip and the upper sheet and each of said core strips having projections which are arranged in close proximity to each other in the lower margin, some of which are tapered in one direction from the first side wall of each core strip to a plane extending beyond the second side wall of the same core strip and others of which are tapered in the opposite direction from the second side wall of each core strip to a plane extending beyond the first side wall of the core strip to provide angularly-shaped projections, each having an outer penetrating edge portion and in which each angularly-shaped projection in the lower margin of each core strip is embedded in the metal of the lower sheet to provide a mechanical connection between each core strip and the lower sheet.

2. A panel including upper and lower thin metal sheets arranged in opposed spaced relation to each other, a plurality of metal core strips interposed between said sheets which are spaced from each other throughout their length, each of which core strips is zig zag in shape and consists of a plurality of focal portions and side walls diverging from each focal portion which focal portions and diverging side walls are parallel to the focal portions and the diverging side walls of other core strips to provide a free space between proximate core strips for receiving removable core supporting means and each of said core strips having spaced tapered projections in its upper margin which are arranged in close proximity to each other and which are harder than the metal of which the sheets is composed, some of which projections are tapered in one direction from the first side wall of each core strip to a plane extending beyond the second side wall of the same core strip and others of which are tapered in the opposite direction from the second side wall of the same core strip to a plane extending beyond the first side wall of the same core strip to provide angularly-shaped projections, each of which has an outer penetrating edge and in which each of the angularly-shaped projections in the upper margin of each core strip is embedded in the metal of the upper sheet to provide a mechanical connection between the core strips and the upper sheet and each of said core strips having projections in its lower margin which are arranged in close proximity to each other, some of which are tapered in one direction from the first side wall of each core strip to a plane extending beyond the second side wall of the same core strip and others of which are tapered in the opposite direction from the second side wall of each core strip to a plane extending beyond the first side wall of the core strip to provide angularly-shaped projections, each having an outer penetrating edge portion and in which each angularly-shaped projection in the lower margin of each core strip is embedded in the lower sheet to provide a mechanical connection between each core strip and the lower sheet, and said core strips being so thin in cross section that they would collapse unless supported when pressure is applied to the outer faces of the sheets to embed the projections in the upper and lower margins of the core strips into the respective sheets.

3. A panel as defined in claim 2 in which the projections in both the upper and lower margins of each core strip that are tapered in one direction from the first side wall of each core strip to a plane extending beyond the second side wall of the same core strip are arranged in alternate relation to the projections which are tapered from the second side wall of the same core strip to a plane extending beyond the first side wall of the same core strip.

4. A panel as defined in claim 2 in which only a portion of each of the tapered projections in the upper margin of each core strip is angularly embedded within the metal of the upper sheet and only a portion of each tapered projection in the lower margin of each core strip is angularly embedded in the metal of the lower sheet.

5. A panel as defined in claim 2 in which the upper and lower margins of each core strip are provided with a plurality of spaced notches separating the projections and the outer portion of each projection has a sharp penetrating edge portion of substantial width.

6. A panel including upper and lower metal sheets arranged in opposed relation to each other, a plurality of thin spaced metal core strips interposed between said sheets, each of which is zig zag in shape and consists of a plurality of aligned focal portions on each side thereof and side walls diverging from each focal portion and said core strips being so arranged that the focal portions on each core strip are in alignment with the corresponding focal portions on each of the other core strips and said core strips being spaced from each other at a sufficient distance to permit supporting means for the core strips to be arranged between adjacent core strips but being at a distance less than the perpendicular distance between lines drawn through the focal portions on the opposite sides of each core strip and each of said core strips having spaced projections in its upper margin which are harder than the metal of which the sheets is composed, some of which projections are tapered from the first side wall of each core strip to a plane extending beyond the second side wall and others of which are tapered in the opposite direction from the second side wall of the core strip to a plane extending beyond the first side wall of the same core strip to provide projections, each of which has an outer penetrating edge of substantial width and in which each projection in the upper margin of each core strip is angularly embedded within the metal of the upper sheet in a direction corresponding to the direction it is tapered to provide a mechanical connection between the core strips and the upper sheet and each of said core strips having projections in its lower margin, some of which are tapered in one direction from its first side wall to a plane extending beyond the second side wall of each core strip and others of which are tapered from the second side wall of each core strip to a plane extending beyond the first side wall of the same core strip and in which each projection in the lower margin of each core strip is angularly embedded within the metal of the lower sheet in a direction corresponding to the direction it is tapered.

7. A panel including upper and lower metal sheets arranged in opposed spaced relation to each other, a plurality of spaced metal core strips interposed between said sheets, each of which is zig zag in shape and consists of a plurality of aligned apices on each side thereof and side walls diverging from each of said apices, and said core strips being so arranged that the apices of each core strip are in alignment with the corresponding apices on each of the other core strips and said core strips being spaced from each other at a sufficient distance to permit removable supporting means for the core strips to be inserted between proximate core strips but at a distance less than the perpendicular distance between lines drawn through the apices on the opposite sides of each core strip and each of said core strips having closely spaced projections in its upper margin which are harder than the metal of which the upper sheet is composed, some of which projections are tapered in one direction from the first side wall of each core strip to a plane extending beyond its second side wall to provide outer penetrating edges of substantial width and others of which are tapered in the opposite direction from the second side wall of the same core strip to a plane extending beyond the first side wall of the core strip to provide penetrating edge portions in the upper margin of each core strip of substantial width, each of which is embedded in the metal of the upper sheet in a direction corresponding to the direction it is tapered to provide a mechanical connection between the core strips and the upper sheet and each of said core strips having closely spaced projections in its lower margin which are harder than the metal of which the lower sheet is composed, some of which are tapered in one direction from the first side wall of each core strip to a plane extending beyond alignment with the second side wall of the same core strip to provide a penetrating edge portion of substantial width and others of which are tapered in the opposite direction from the second side wall of each core strip to a plane extending beyond first side wall of the same core strip to provide a penetrating edge portioin of substantial width and in which each projection in the lower edge margin of each core strip is angularly embedded in the metal of the lower sheet in a direction corresponding to the direction it is tapered to provide a mechanical connection between the core strips and the lower sheet, and each of said core strips being so thin in cross section that it would collapse unless supported when pressure is applied to the outer faces of the sheet to embed the projections in the upper and lower margins of the core strips into the respective sheets.

References Cited by the Examiner

UNITED STATES PATENTS

| | | | |
|---|---|---|---|
| 1,201,945 | 10/16 | Dodds | 29—547 |
| 1,205,172 | 11/16 | Dodds | 29—547 |
| 2,056,563 | 10/36 | Budd et al. | |
| 2,349,547 | 5/44 | Gisondi | 50—319 |
| 2,486,769 | 11/49 | Watson. | |
| 2,603,318 | 7/52 | Cushman | 189—36 |
| 2,814,717 | 11/57 | Hardesty. | |
| 2,955,688 | 10/60 | Karlstrom | 189—36 |
| 2,956,651 | 10/60 | Allred et al. | 189—34 |
| 3,001,614 | 9/61 | Shane | 189—34 |

FOREIGN PATENTS

| | | |
|---|---|---|
| 64,500 | 5/46 | Denmark. |
| 1,014,689 | 6/52 | France. |

JACOB L. NACKENOFF, *Primary Examiner.*

H. BIZOT, HENRY C. SUTHERLAND, *Examiners.*